US007958078B2

(12) United States Patent
Lin et al.

(10) Patent No.: US 7,958,078 B2
(45) Date of Patent: Jun. 7, 2011

(54) CLUSTERING TRIZ ANALYSIS METHOD

(75) Inventors: Zone-Ching Lin, Taipei (TW); Mi-Yung Chen, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 825 days.

(21) Appl. No.: 11/969,686

(22) Filed: Jan. 4, 2008

(65) Prior Publication Data

US 2008/0294658 A1    Nov. 27, 2008

(30) Foreign Application Priority Data

May 21, 2007    (TW) .............................. 96118028 A

(51) Int. Cl.
*G06F 17/00* (2006.01)
*G06N 5/02* (2006.01)
(52) U.S. Cl. ................. 706/48; 706/20; 706/12
(58) Field of Classification Search .................. None
See application file for complete search history.

(56) References Cited

U.S. PATENT DOCUMENTS 7,716,226 B2 *    5/2010 Barney .................. 707/748

OTHER PUBLICATIONS

Low et al., M., "Product to Service Eco-Innovation: The TRIZ Model of Creativity Explored", IEEE, pp. 209-214, 2000.*
Timm et al., H., "Fuzzy Cluster Analysis of Classified Data", IEEE, pp. 1431-1436, 2001.*
Ross, V., "A Comparison of Tools Based on the Inventive Principles of TRIZ", The TRIZ Journal, pp. 1-96, Nov. 2006.*
Salamatov, Y., "TRIZ: The Right Solution at the Right Time", pp. 1-20, 1999.*
Nurnberger et al., A., "Improving Naive Bayes Classifiers Using Neuro-Fuzzy Learning", IEEE, pp. 154-159, 1999.*

* cited by examiner

*Primary Examiner* — Donald Sparks
*Assistant Examiner* — Adrian L Kennedy

(57) ABSTRACT

The TRIZ decision process of the clustering method proposed by this invention uses the characteristics and invention rules from the contradiction matrix table resulting from massive quantities of patent inferences to find a similar or approximate character group and invention rule group of the physical meanings, and also applies statistics to calculate the number of display times of the groups to be the basic foundation. Apart from the number of display times, Bayes probability, fuzzy object oriented method and Bayes probability combined with fuzzy object oriented method can be used as the system. The reading value is utilized as a foundation for prioritizing the sequence of consideration for the groups, in which the system reading value constructed by different models gives designers lots of options to perform the reading, so as to acquire the undesired result features of the prioritized consideration.

10 Claims, 5 Drawing Sheets

CLUSTERING TRIZ ANALYSIS METHOD

BACKGROUND

The invention relates to decision process, and in particular to TRIZ decision process of a clustering method.

This section is intended to introduce the reader to various aspects of the art, which may be related to various aspects of the present invention, which are described and/or claimed below. This discussion is believed to be helpful in providing the reader with background information to facilitate a better understanding of the various aspects of the present invention. Accordingly, it should be understood that these statements are to be read given said understanding, and not as admissions of prior art.

In creating a design, designers are often confronted with contradictory problems due to different realistic conditions, or are indulged in deep thought, resulting in research and development (R & D) delays and inefficient use of time. In order to facilitate the creative process, abstract-idea-based design concepts and engineering problem-solving techniques have become objective trends for designers. The intelligent system implemented by this practice shall help improve the design process.

Conventionally, when using a TRIZ matrix, manpower is required for determining improving features and no-worsening features in advance, thereby finding several inventive principles, and accordingly determining better inventive principles. It is difficult for a less-experienced user to determine no-worsening features and priority among inventive principles.

SUMMARY

Certain aspects commensurate in scope with the claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

A clustering TRIZ analysis method is provided. The method comprises steps of: (1) constructing cluster elements according to features and inventive principles of a TRIZ matrix by associating items with similar physical meanings as one cluster; (2) calculating display times of each cluster according to improved feature cluster and inventive principle cluster, calculating the display times of the corresponding inventive principle cluster and the no-worsening feature cluster according to a TRIZ contradiction matrix, and storing results of the calculation in a database; (3) determining discrimination values of each model according to the display time results in step (2), and using the discrimination values to determine a priority order of the clusters.

BRIEF DESCRIPTION OF DRAWINGS

The invention can be more fully understood by reading the subsequent detailed description and examples with references made to the accompanying drawings, wherein.

DETAILED DESCRIPTION

One or more specific embodiments of the invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacturing for those with ordinary skill of the art having the benefit of this disclosure.

In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense. The leading digit(s) of reference numbers appearing in the figures corresponds to the Figure number, with the exception that the same reference number is used throughout to refer to an identical component which appears in multiple Figures. It should be understood that many of the elements described and illustrated throughout the specification are functional in nature and may be embodied in one or more physical entities or may take other forms beyond those described or depicted.

Figure 1:
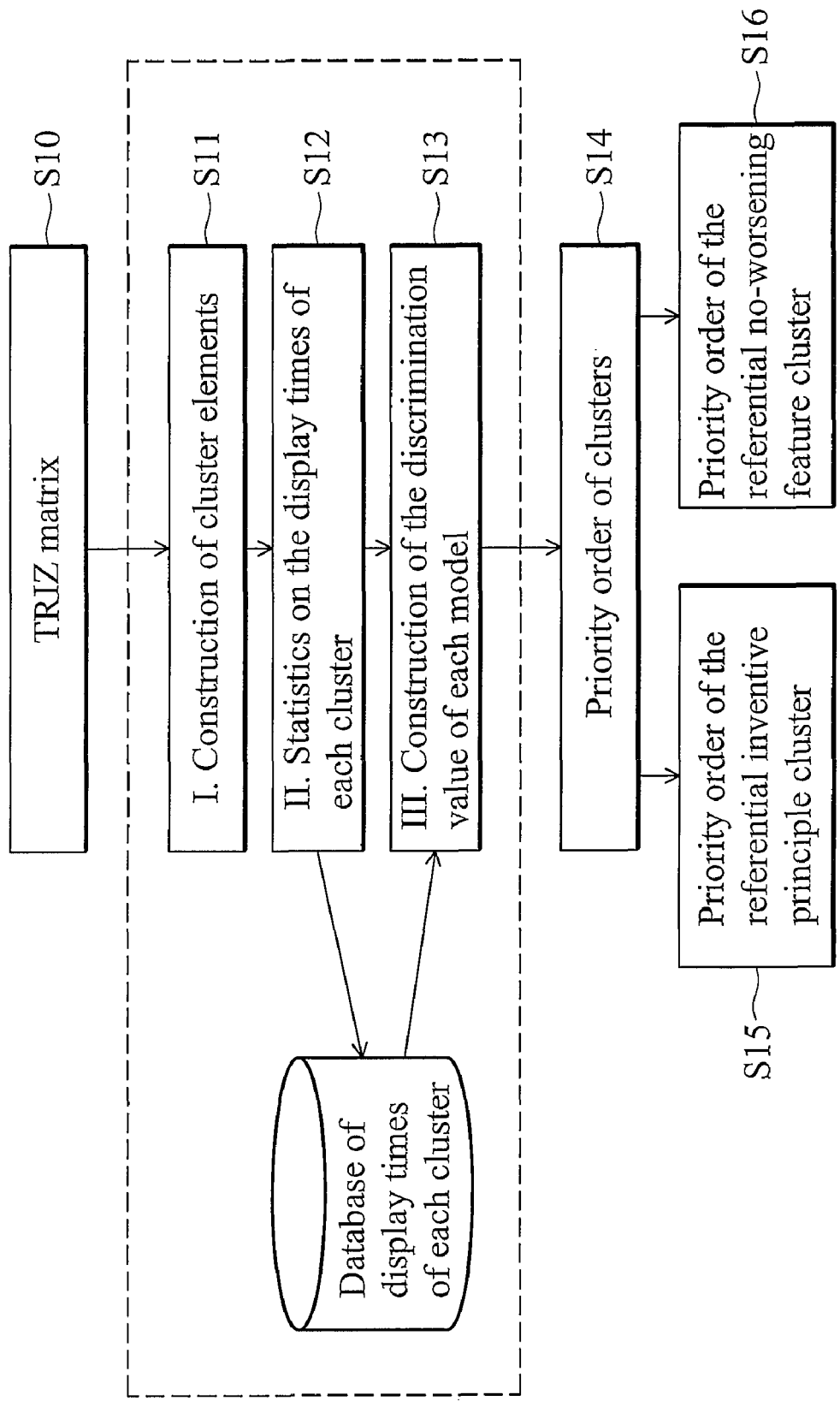
FIG. 1 is a schematic view of an embodiment of a clustering TRIZ deciphering model.

FIG. 1 shows a clustering TRIZ deciphering model, which is generally described as follows:

In step S10, a TRIZ matrix is provided.

Figure 2:
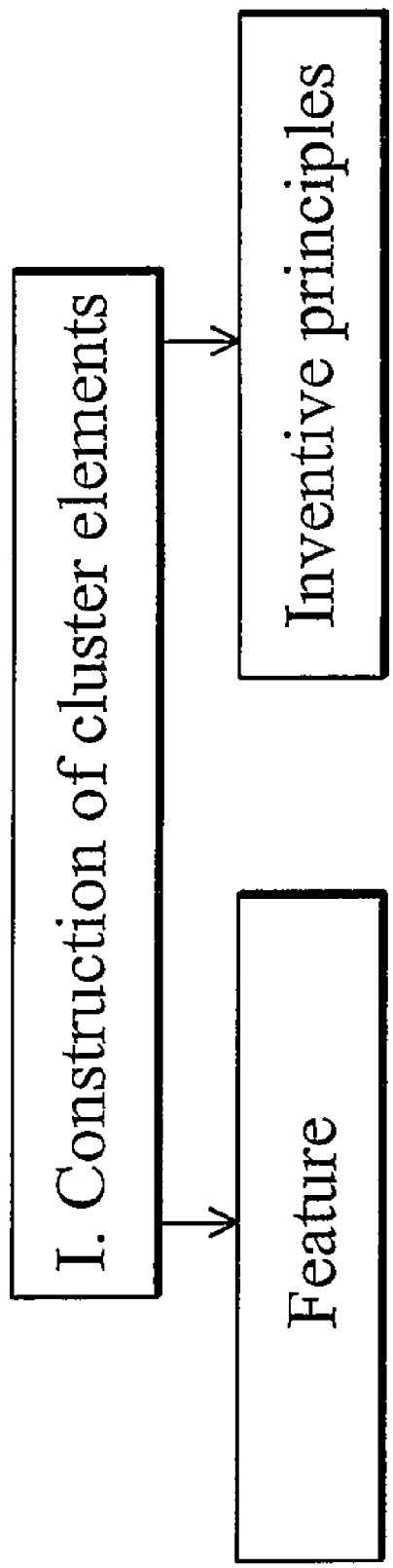
FIG. 2 is a schematic view of an embodiment of construction of cluster elements.

In step S11, cluster elements are constructed. The cluster elements are matched with the features and the inventive principles of the TRIZ matrix, and are collated to be clusters according to similar physical meanings, as shown in FIG. 2.

Figure 3:
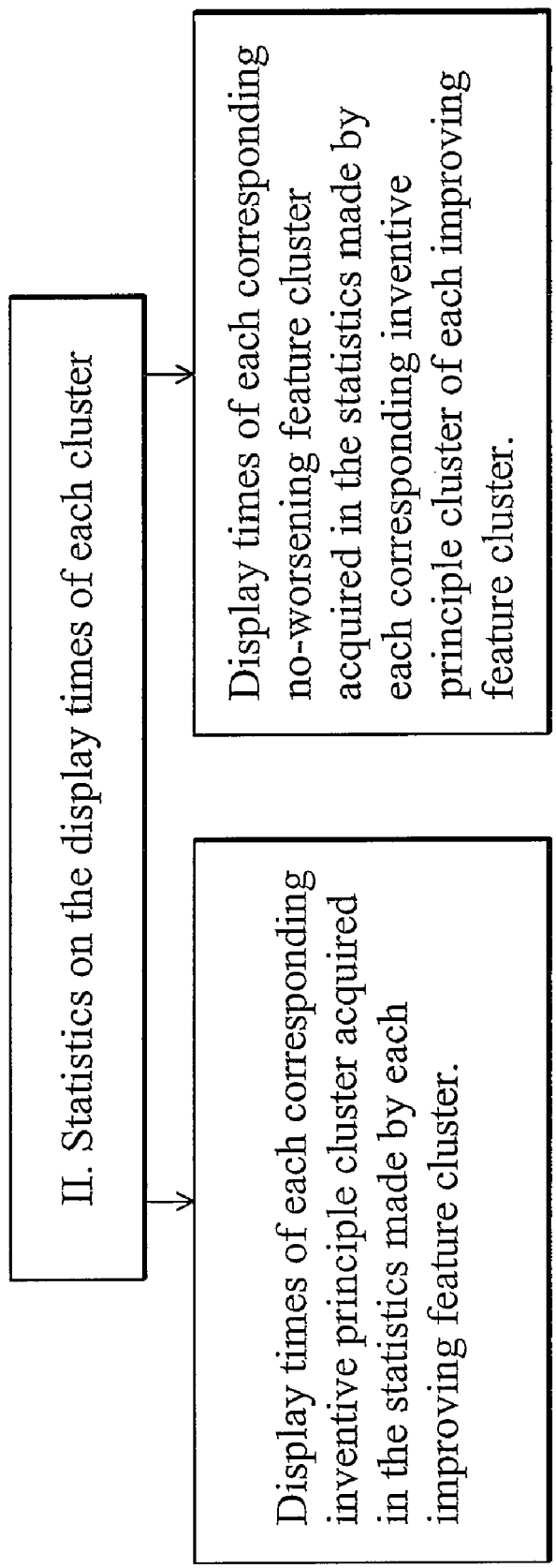
FIG. 3 is a schematic view of an embodiment of calculation of display times of each cluster.

In step S12, display times of each cluster are calculated. The display times of the corresponding inventive principle cluster and the no-worsening feature cluster are calculated by means of the clustered improved feature cluster and inventive principle cluster, and through the TRIZ contradiction matrix, and then stored in the database, which can be a reference for the construction of each model. The details are shown in FIG. 3.

Figure 4:
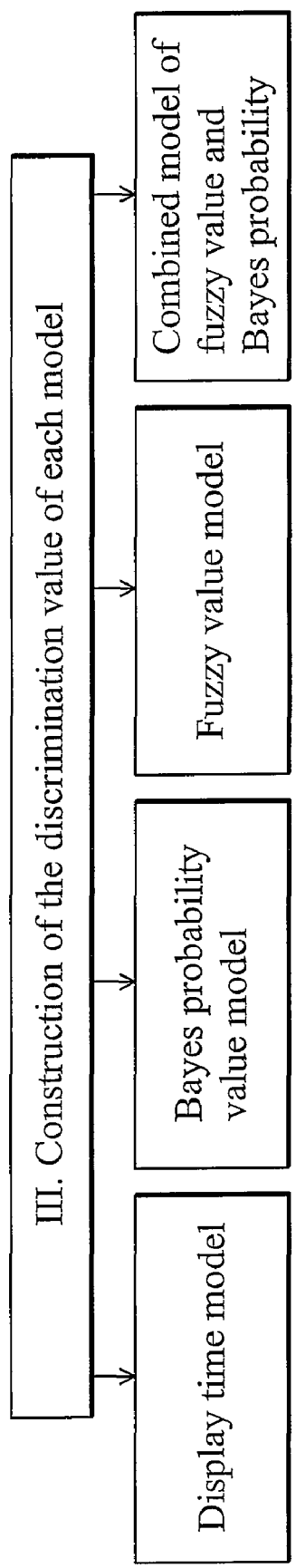
FIG. 4 shows a schematic view of an embodiment of establishment of discrimination values of each model.

In step S13, the discrimination values of each model are established. The discrimination values are matched with the display time results from the statistics in step S12. Furthermore, the display times are used to construct the discrimination methods of each model (including the display time model, Bayes probability model, fuzzy value model, and the combined fuzzy value and the Bayes probability model). The discrimination value acquired by the system is taken as the priority order of clusters (step S14), from which designers can consider a suitable priority order of clusters for the design (steps S15 and 16). The details are shown in FIG. 4.

1. Construction of Cluster Elements (Step S11 in FIG. 1, as Shown in FIG. 2)

Based on the likelihood of the physical meanings, the 39 features and 40 inventive principles of the TRIZ matrix are rearranged to be 13 clusters. For example, the clustering of the 40 features comprises object segmentation and extraction cluster, prior handling cluster, counteraction cluster, cluster of partial action or structural change, balance object cluster, vibration and structural dynamicity cluster, harmful factor cluster, mechanical system replacement cluster, material cluster, physical change cluster, chemical action cluster, rejection and maintenance cluster, and system combination cluster. Object segmentation and extraction cluster comprises principles of segmentation, extraction, asymmetry, prior action, cushion in advance, and dynamicity. Cluster of partial action or structural change comprises principles of local quality, spheroidality, and partial, overdone or excessive action. Mechanical system replacement cluster comprises principles of moving to a new dimension, copying, replacement of a mechanical system, use of a pneumatic or hydraulic construction, and color change. Material cluster comprises principles of substituting an expensive, durable object by an inexpensive, short-life one, flexible film or thin membrane, use of porous material, homogeneity, and composite material.

2. Next, construction of each model is described. (FIG. 1, step S13)

(1) Display Time Model

The construction process of the display time model is described as follows:

Step 1: The improved feature clusters and the inventive principle clusters having similar physical meanings are selected.

Step 2: The display times acquired from the statistics on the various clusters are calculated in accordance with the contents of the TRIZ matrix, together with the display time results from the statistics on each corresponding inventive principle cluster made by each improved feature cluster.

Step 3: The acquired display times are used as a reference for users in arranging the priority order of the inventive principle clusters. The display times are arranged in proper order as shown in Table 1.

Step 4: The moving object cluster is acquired. The moving object cluster is the display times acquired from the statistics on the corresponding inventive principle clusters and no-worsening feature clusters of the improved feature clusters in accordance with the contents of the TRIZ matrix, together with the display time results from the statistics on each corresponding no-worsening feature cluster made by each corresponding inventive principle cluster of each improved feature cluster.

Step S5: The acquired display times are used as a reference for users in arranging the priority order of the no-worsening feature clusters. Taking the moving object feature cluster as the considered improving factor, the display times of the object segmentation and extraction inventive principle clusters and the corresponding no-worsening feature clusters can be acquired, as shown in Table 2.

(2) Bayes Probability Model

The construction process of the Bayes probability model is described as follows:

Step 1: The improved feature clusters and the inventive principle clusters having similar physical meanings are selected.

Step 2: The required display probability is acquired in accordance with the contents of the TRIZ matrix, together with the display time results from the statistics on each corresponding inventive principle cluster ($I_j$) made by each improved feature cluster. The Bayes probability ($P(C_i|I_j)$) of each inventive principle cluster is realized through the Bayes theorem equation, which is expressed as equation (3-1).

$$P(C_i | I_j) = \frac{P(C_i) \times P(I_j | C_i)}{P(I_j)} = \frac{P(C_i) \times P(I_j | C_i)}{\sum_{j=1}^{a} [P(C_i) \times P(I_j | C_i)]} \quad (3-1)$$

In equation (3-1), "a" denotes the total number of inventive principle clusters, i denotes the number of improved feature clusters, and i=1, 2, . . . , 10, j denotes number of inventive principle clusters, and j=1, 2, . . . , 13, $P(C_i)$ denotes the display probability of improved feature cluster (Ci) in the entire TRIZ table, and $P(I_j|C_i)$ denotes the display probability of inventive principle cluster (Ij) in the improved feature cluster.

Step 3: The acquired Bayes probability value is taken as the priority order, which is taken by users as a reference for priority order in the no-worsening feature clusters. A table of the probability value of each corresponding inventive principle cluster of the moving object improved feature cluster is formulated, as shown in Table 3.

Step 4: The required display probability is acquired in accordance with the contents of the TRIZ matrix, together with the statistics on the display times of each corresponding no-worsening feature cluster ($I'_j$) made by each corresponding inventive principle cluster ($C'_i$) of each improved feature cluster. The Bayes probability value $P'(C'_i|I'_j)$ of each no-worsening feature cluster is realized through the Bayes theorem equation, which is expressed as equation (3-2):

$$P'(C'_i | I'_j) = \frac{P'(C'_i) \times P'(I'_j | C'_i)}{P'(I'_j)} = \frac{P'(C'_i) \times P'(I'_j | C'_i)}{\sum_{j=1}^{b} [P'(C'_i) \times P'(I'_j | C'_i)]} \quad (3-2)$$

In equation (3-2), b denotes the total number of no-worsening feature clusters, i denotes the number of inventive principle clusters, and i=1, 2, . . . , 13, j denotes number of no-worsening feature clusters, and j=1, 2, . . . , 10, $P'(C'_i)$ denotes the display probability of improved feature cluster ($C'_i$) in the inventive feature cluster, and $P'(I'_j|C'_i)$ denotes the display probability of no-worsening feature cluster ($I'_j$) in the inventive principle cluster.

Step S5: The acquired Bayes probability value is taken as the priority order, which is a reference for priority order in the no-worsening feature cluster. Table 4 shows the probability values of the corresponding object segmentation and extraction inventive principle clusters and the corresponding no-worsening feature clusters while taking the moving object feature cluster as the considered improving factor.

(3) Fuzzy Value Model

The construction process of the Fuzzy value model is described as follows:

Step 1: The improved feature clusters and the inventive principle clusters having similar physical meanings are selected.

Step 2: The fuzzy relationship value of each element in each feature cluster is defined by 10 feature clusters having similar physical meanings in accordance with the concept of the fuzzy object oriented model. For example, a certain feature in the cluster is used as a major consideration factor for defining the fuzzy relationship value (F_value) between the major considered feature factor and other related features. In the moving object cluster, if the weight of moving object (simply referred to as "WMO," hereinafter) is taken as the major consideration target, then the fuzzy relationship value with the length of moving object (simply referred to as "LMO," hereinafter) is 0.6, the fuzzy relationship value with the area of moving object (simply referred to as "AMO," hereinafter) is 0.7, and the fuzzy relationship value with the volume of moving object (simply referred to as "VMO," hereinafter) is 0.8. The fuzzy relationship values of other elements are shown in Table 5.

Step 3: The display times (I_F_value$_i$) of the added fuzzy value of each cluster and the total display times (S_F_value$_j$) of the added fuzzy values of the entire cluster required by the system is acquired in accordance with the contents of the TRIZ matrix, together with the statistics on the display times (N$_i$) of each corresponding inventive principle cluster made by the improved feature cluster, and from the fuzzy relationship value (F_value$_i$) between the display times (N$_i$) and the elements in the improved feature cluster acquired through the fuzzy object oriented model. The correlation is shown as in equation (3-3, 3-4):

$$\text{I\_F\_value}_i = N_i \times \text{F\_value}_i, \quad i = 1, \ldots, a \quad (3\text{-}3)$$

$$\text{S\_F\_value}_j = \sum_{i=1}^{a}(\text{I\_F\_value}_i), \quad j = 1, 2, \ldots, 13 \quad (3\text{-}4)$$

In equations (3-3) and (3-4), "a" denotes the total number of feature factors contained in the cluster.

Step 4: The acquired total display times of the added fuzzy values of the entire cluster is taken as the priority order, which is the user's referential priority order in the inventive principle cluster.

Step S5: The display times (N_I_F_value$_i$) of the added fuzzy value of each cluster and the total display times (N_S_F_value$_j$) of the added fuzzy values of the entire cluster required by the system are acquired in accordance with the contents of the TRIZ matrix, together with the statistics on the display times (N_N$_i$) of each corresponding no-worsening feature cluster made by each corresponding inventive principle cluster of the elements in each improved feature cluster, and from the fuzzy relationship value (F_value$_i$) between the display times (N_N$_i$) and the elements in the improved feature clusters acquired through the fuzzy object oriented model. The correlation is shown in equations (3-5) and (3-6):

$$\text{N\_I\_F\_value}_i = \text{N\_N}_i \times \text{F\_value}_i, \quad i = 1, \ldots, a \quad (3\text{-}5)$$

$$\text{N\_S\_F\_value}_j = \sum_{i=1}^{a} \text{N\_I\_F\_value}_i, \quad j = 1, 2, \ldots, 10 \quad (3\text{-}6)$$

In equations (3-5) and (3-6), "a" denotes the total number of feature factors contained in the cluster.

Step 6: The acquired total display times of the added fuzzy values of the entire cluster is taken as the priority order, which is the user's referential priority order in the no-worsening feature cluster.

(4) Combined Fuzzy Value and Bayes Probability Model

The construction process of the combined fuzzy value and Bayes probability model is described as follows:

Step 1: The improved feature clusters and the inventive principle clusters having similar physical meanings are selected.

Step 2: The fuzzy relationship value of each element in each cluster is defined by 10 feature clusters having similar physical meanings in accordance with the concept of the fuzzy object oriented model. The practice is to take a certain feature in the cluster as a major consideration factor for defining the fuzzy relationship value (F_value) between the major considered feature factor and other related features. In the moving object feature cluster, if the WMO is taken as the major consideration target, then the fuzzy relationship value with the LMO is 0.6, the fuzzy relationship value with the AMO is 0.7, and the fuzzy relationship value with the VMO is 0.8. The fuzzy relationship values of other elements are shown in Table 6.

Step 3: The display times (I_F_value$_i$) of the added fuzzy value of each feature factor and the total display times (S_F_value$_i$) of the added fuzzy values of the entire cluster are acquired in accordance with the contents of the TRIZ matrix, together with the statistics on the display times (N$_i$) of each corresponding inventive principle cluster made by the improved feature cluster (C$_m$), and from the fuzzy relationship value (F_value$_i$) between the display times and the elements in the improved feature cluster acquired through the fuzzy object oriented model. The correlation is shown in equation (3-7, 3-8).

$$\text{I\_F\_value}_i = N_i \times \text{F\_value}_i, \quad i = 1, \ldots, a \quad (3\text{-}7)$$

$$\text{S\_F\_value}_j = \sum_{i=1}^{a}(\text{I\_F\_value}_i), \quad j = 1, 2, \ldots, 13 \quad (3\text{-}8)$$

In equations (3-7) and (3-8), "a" denotes the total number of inventive principle clusters.

Table 7 shows the display times of the corresponding object segmentation and extraction cluster of each feature factor in the moving object cluster. Table 8 shows the fuzzy relationship values that take WMO as the major element in the moving object cluster. Table 9 shows the display times (I_F_value$_i$) of the added fuzzy value of the corresponding object segmentation and extraction cluster of each feature factor in the moving object cluster and the total display times (S_F_value$_i$) of the added fuzzy values of the WMO-based object segmentation and extraction cluster.

Step 4: The display probability (P(F_I$_n$|C$_m$)) of the added fuzzy value is obtained by using the total display times (S_F_value$_i$) of the added fuzzy values of the entire cluster acquired in Step 3. The relation equation is shown in equation (3-9). The Bayes probability value (P(C$_m$|F_I$_n$)) of the added fuzzy value of each inventive principle cluster is acquired through the Bayes theorem equation. The Bayes theorem equation is expressed as equation (3-10).

$$P(\text{F\_I}_n | C_m) = \frac{\text{S\_F\_value}_i}{\sum_{i=1}^{13} \text{S\_F\_value}_i} \quad (3\text{-}9)$$

$$P(C_m | \text{F\_I}_n) = \frac{P(C_m) \times P(\text{F\_I}_n | C_m)}{\sum_{n=1}^{13}[P(C_m) \times P(\text{F\_I}_n | C_m)]} \quad (3\text{-}10)$$

In equations (3-9) and (3-10), "m" denotes the number of improved feature clusters, and m=1, 2, ..., 10, "n" denotes the number of inventive principle clusters, and n=1, 2, ..., 13, P(C$_m$) denotes the display probability of the added fuzzy value of the improved feature cluster (C$_m$) in the entire TRIZ matrix, and $P(F\_I_n|C_m)$ denotes the display probability of the added fuzzy value of the inventive principle cluster ($F\_I_n$) in the improved feature cluster.

Table 10 shows the representative values of $P(C_m)$ and $P(F\_I_n|C_m)$ of the corresponding object segmentation and extraction cluster of the moving object cluster. Table 11 shows the probability value ($P(C_m|F\_I_n)$) of the corresponding object segmentation and extraction cluster of the moving object cluster.

Step S5: The acquired probability value of the added fuzzy value is taken as the priority order, which is the user's referential priority order in the inventive principle cluster. Table 12 shows the fuzzied probability value of each corresponding inventive principle cluster of the moving object cluster which takes WMO as the consideration target.

Step 6: The display times ($N'\_I\_F\_value_i$) of the added fuzzy value of each cluster and the total display times ($N'\_S\_F\_value_j$) of the added fuzzy values of the entire cluster are acquired in accordance with the contents of the TRIZ matrix, together with the statistics on the display times ($N'\_N_i$) of each corresponding no-worsening feature cluster ($C'_m$) made by each corresponding inventive principle cluster of the element in each improved feature cluster, and from the fuzzy relationship value ($F\_value_i$) between the display times ($N'\_N_i$) and the elements in the improved feature cluster acquired through the fuzzy object oriented model. The correlation is shown in equation (3-11, 3-12).

$$N'\_I\_F\_value_i = N'\_N_i \times F\_value_i, \quad i=1,\ldots,a \quad (3\text{-}11)$$

$$N'\_S\_F\_value_j = \sum_{i=1}^{a} N'\_I\_F\_value_i, \quad j=1,2,\ldots,10 \quad (3\text{-}12)$$

In equations (3-11) and (3-12), "a" denotes the total number of inventive principle clusters.

Table 13 shows the display times of the corresponding physical property cluster of the feature factor in the moving object cluster that takes WMO as the major consideration factor. Table 14 shows the fuzzy relationship values of the feature factor in the moving object cluster that takes WMO as the major consideration factor. Table 15 shows the display times of the added fuzzy value of the physical property cluster in each feature factor and the total display times of the added fuzzy values of the entire cluster.

Step 7: The display probability ($P'(F'\_I_n|C_m)$) of the added fuzzy value is obtained by using the total display times ($N'\_S\_F\_value_j$) of the added fuzzy values of the entire cluster acquired in Step 6. The relation equation is shown in equation (3-13). The Bayes probability value of each inventive principle cluster is acquired through the Bayes theorem equation. The Bayes theorem equation is expressed as equation (3-14).

$$P'(F'\_I_n | C'_m) = \frac{N'\_S\_F\_value_j}{\sum_{i=1}^{13} N'\_S\_F\_value_j} \quad (3\text{-}13)$$

$$P'(C'_m | F'\_I_n) = \frac{P'(C'_m) \times P'(F'\_I_n | C'_m)}{\sum_{n=1}^{10} [P'(C'_m) \times P'(F'\_I_n | C'_m)]} \quad (3\text{-}14)$$

In equations (3-13) and (3-14), "m" denotes the number of inventive principle clusters, and $m=1, 2, \ldots, 13$; "n" denotes number of worsening feature clusters, and $n=1, 2, \ldots, 10$; $P'(C'_m)$ denotes the display probability of the added fuzzy value of the improved feature cluster ($C'_m$) in the improved feature cluster, and $P'(F'\_I_n|C'_m)$ denotes the display probability of the added fuzzy value of the no-worsening feature cluster ($F'\_I_n$) in the inventive principle cluster.

Table 16 shows the representative values of $P'(C'_m)$ and $P'(F'\_I_n|C'_m)$ of the object segmentation and extraction inventive principle cluster. Table 17 shows the probability value of the added fuzzy value required by the system of the corresponding physical property cluster of the moving object cluster.

Step 8: The probability value of the added fuzzy value is taken as the priority order, which is the user's referential priority order in the no-worsening feature cluster. Table 18 shows the probability value of the added fuzzy value, which is matched with the Bayes probability equation of the system of each corresponding no-worsening feature cluster of the corresponding object segmentation and extraction inventive principle cluster of the moving object cluster.

3. Deciphering Procedures of Clustering TRIZ Deciphering Model

Figure 5:
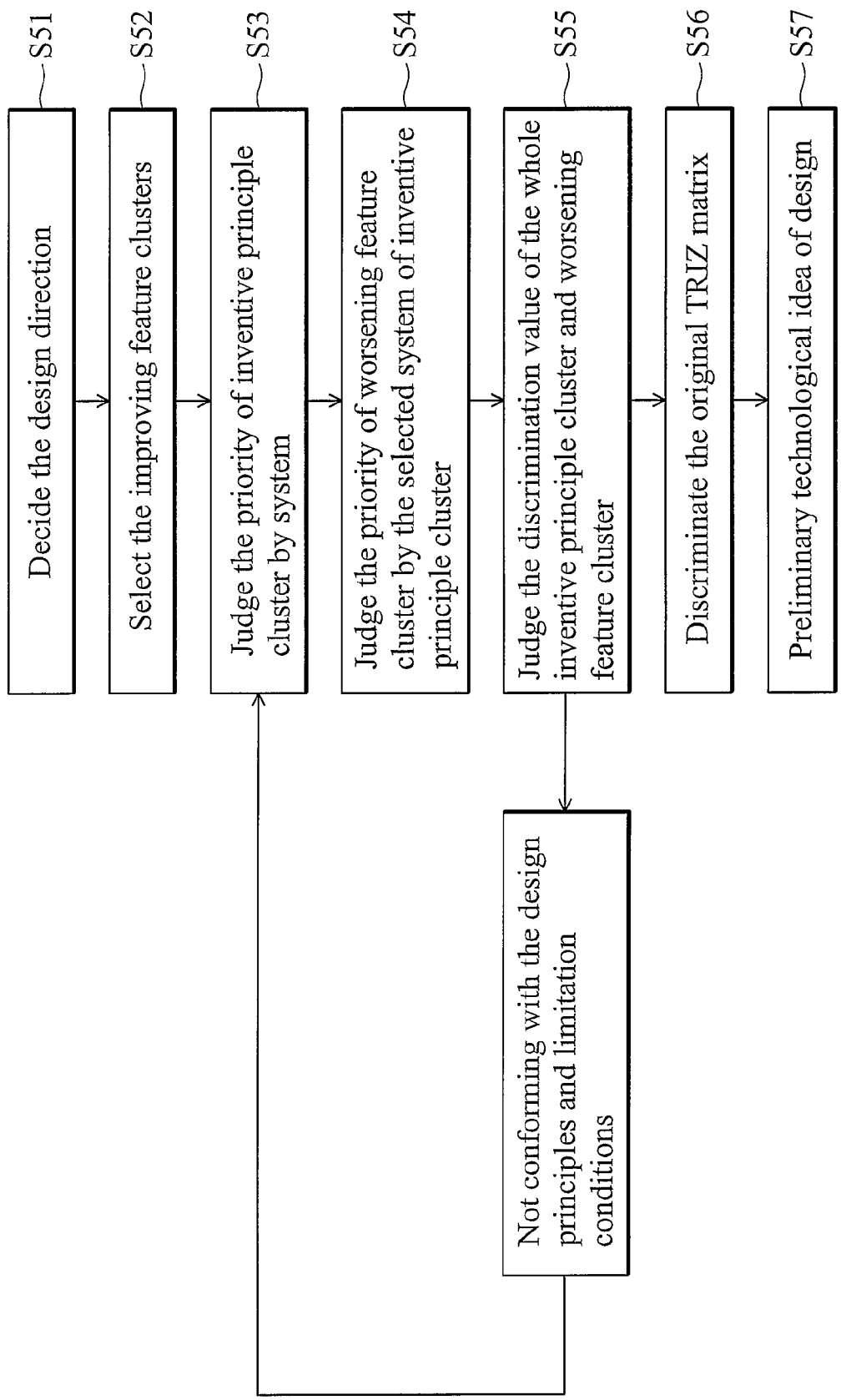
FIG. 5 shows a flowchart of a process for improving the deciphering ability of the TRIZ matrix.

The process for improving the deciphering ability of the TRIZ matrix is illustrated in FIG. 5, comprising 6 steps:

In step S51, the design direction is determined. A user (designer) evaluates knowledge of various aspects of the design and related patent information, and determines the goal achievements of the new design direction and the related limitation conditions.

In step S52, the improved feature clusters are selected. Coordinating with the decided new design direction, the consideration of the meanings of the 10 feature clusters is carried out. The improved feature clusters that conform to the design direction are selected to carry out system judgment.

In step S53, the priority of inventive principle cluster is determined by the system. Entering the system interface by inputting selected improved feature cluster (as shown in Appendix 1), a menu for selecting the decided improved feature clusters is provided, such as the moving object cluster. When the analysis button is pressed, the priority order of the related inventive principle clusters is determined, as shown in the table in Appendix 2. The table shows the inventive principle cluster of the priority order. The order of the considered selections from the top to the bottom includes the inventive principle clusters which are considered suitable for the design direction and available technology. When the button of the statistical table on times and the probability table is pressed, a file in Excel format is shown (see Appendix 3). References of different models are provided for facilitating calculation of the discrimination value, helping users make a correct judgment when considering the inventive principle cluster conforming to the design direction.

In step S54, the priority order of the no-worsening feature cluster is determined by the system. According to the inventive principle clusters selected in Step S53, the clusters in the interfaced table are selected, as shown in Appendix 4. The priority order of the no-worsening feature cluster is determined by the system. The order of the considered selections from the top to the bottom includes the no-worsening feature clusters which are considered suitable for the design direction and available technology. When the button of the statistical table on times and the probability table is pressed, a file in Excel format is shown (see Appendix 5). It provides users with referential values in deciding the priority order when considering the no-worsening feature cluster conforming to the design direction.

In step S55, the general table of discrimination values of the entire inventive principle cluster and the no-worsening feature cluster is generated, just like the general table of display times of the corresponding inventive principle cluster of the moving object cluster and different no-worsening feature clusters, as shown in Appendix 6. The table of probability conversion is selected, and then the display times are converted to the form of a probability value, as shown in Appendix 7. Based on the selected no-worsening feature clusters, it is determined whether the best priority order is in the general table of discrimination values of the inventive principle cluster and the no-worsening feature cluster. During the discrimination, it is determined whether the roll is the best priority order through the vertical examination of the selected inventive principle clusters, or whether the column is the best priority order through the horizontal examination of the selected no-worsening feature clusters. After the determination, it is known whether the result conforms to the design direction, limitation conditions and technological requirements. If positive, a better no-worsening feature cluster can be decided, if negative, the steps return to Step 3 to decide the adoption of inventive principle cluster again.

In step S56, the original TRIZ matrix is discriminated. From the selected improved feature clusters and the finally decided no-worsening feature clusters, the single improved feature and the single worsened feature that conform with the design direction and limitation conditions are selected. The original TRIZ matrix, as shown in Table 19, shows the corresponding inventive principle. Then, the preliminary idea of design can be acquired (step S57).

In S57 step, the user get some inventive principle form s56. Then according to these ideas, engineer can judged by the ways of engineering knowledge, inference, analog, etc. So as to generator a preliminary technological idea of a design Using an automatic polishing pad changing structure of the compensating chemical mechanical wafer polishing apparatus as an example, a technological shortcoming exists, i.e., when the main polishing head having a diameter smaller than that of a wafer, and the compensating polishing head are used to undergo polishing, the polishing pad is adhered to the polishing head, and when replacing the polishing pad, the worn out old polishing pad is detached from the polishing head, the surface is cleaned, and then a new polishing pad is attached to it. During the replacement, the CMP has to be shut down for a long period of time, causing inconvenience and inefficient use of time. Therefore, the replacement of polishing pad is improved by automation of the replacement process. The design idea acquired at this time takes the designers' professional experience principles as a reference. Having understood the design direction based on their experience, the designers can follow the traditional TRIZ procedures to discriminate the related suggested conditions that the improving feature is the 38th item, i.e. level of automation, the no-worsening feature is the 28th item, i.e. accuracy of measurement, and the inventive principle is the 28th item, i.e. replacement of mechanical system. After the related suggested conditions are achieved, the designers enter the TRIZ deciphering procedures constructed to carry out discrimination. It is known that the automation of the improving feature is in the control cluster of the improved feature cluster of the system. After using the control cluster, together with the improvement of the interface of the TRIZ deciphering system, a description of the procedures is made as follows:

Step 1: Having known that the improving cluster is the control cluster, the system interface is entered, as shown in Appendix 8.

Step 2: The control cluster is selected through the interface as the major considered improving cluster. The analysis button is pressed, and the priority order of the inventive principle clusters appear as shown in the table of Appendix 9. If the related numerical expressions of the priority order need to be known, the buttons of the statistical table on the number of times and the Bayes probability table are pressed. Then the Excel format as shown in Appendix 10 would appear.

Step 3: After referring to the experience principles of the researcher, it is discriminated that the adopted inventive principle is the replacement of the mechanical system. This inventive principle is in the cluster of mechanical system replacement in the inventive principle cluster of the system. Therefore, based on the priority order of the inventive principle clusters acquired by the system in Step 2, it is observed from the table in Appendix 9 that the 2nd inventive principle cluster being considered in the first priority is the cluster of mechanical system replacement. From the referential numerical values in Appendix 10, it can be clearly seen that the referential numerical values conform to the inventive principle cluster which is considered by designers, and they are not the same values whose difference can thus be perceived. The system also considers the cluster of mechanical system replacement to carry out the judgment of the no-worsening feature cluster.

Step 4: Knowing that the cluster of mechanical system replacement is the considered inventive principle cluster, the cluster of mechanical system replacement on the table of the interface is selected to acquire the priority of the no-worsening feature clusters, as shown in the table in Appendix 11. If the related numerical expressions of the priority order would like to be known, the buttons of the statistical table on the number of times and the Bayes probability table are pressed. Then the Excel format as shown in Appendix 12 would appear.

Step 5: The general table of the entire inventive principle cluster and the no-worsening feature cluster, as shown in Appendix 13, assists in making judgment on the acquired priority of no-worsening feature clusters. After referring to the experience principles of the researcher, it is discriminated that the adopted no-worsening feature is the accuracy of measurement. This no-worsening feature is in the cluster of manufacturing and measurement accuracy in the no-worsening feature cluster of the system. Therefore, based on the priority order of the no-worsening feature clusters acquired by the system in Step 4, it can be observed from the table in Appendix 12 that the 2nd no-worsening feature cluster being considered in the first priority is the cluster of mechanical system replacement, conforming with the consideration direction of designers.

Step 6: It is acquired from Step 3 that the inventive principle cluster is the cluster of mechanical system replacement and from Step 5 that the no-worsening feature cluster is the control cluster. Then a simplified TRIZ matrix as shown in Table 20 can be formed. By clustering, the improved feature cluster, no-worsening feature cluster and inventive principle cluster are filtered out. By using the clustering TRIZ matrix, together with the design concepts and according to level of automation of professional discrimination, the no-worsening feature as the accuracy of measurement, and the inventive principle as the replacement of mechanical system, it can be known that the improving feature, no-worsening feature and inventive principle filtered out from the clustering results are consistent with the results acquired from the traditional TRIZ procedures. For the automatic polishing pad changing structure based on this concept, the mechanical design is to cut the holding ring of polishing pad into two halves. The ring can grip the entire polishing pad and cover the edge of the polishing head, enabling the polishing pad to be firmly fixed on the polishing surface of the polishing head. The outer ring is attached with the track, which drives the machine to complete the automatic gripping action. The replacement of the entire polishing pad can be completely automated, saving mechanical work time.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

TABLE 1

Display times of each corresponding inventive principle cluster of the moving object feature cluster

| Inventive principle cluster | Display times |
| --- | --- |
| Object segmentation and extraction cluster | 126 |
| Replacement of mechanical system | 92 |
| Vibration and structural dynamicity | 52 |
| Physical change cluster | 47 |
| Material cluster | 34 |
| Advanced processing cluster | 28 |
| Partial action or structural change cluster | 26 |
| System combination or integration cluster | 25 |
| Balance object cluster | 23 |
| Rejection and maintenance cluster | 20 |
| Counteraction cluster | 14 |
| Chemical cluster | 13 |
| Harmful factor cluster | 7 |

TABLE 2

Display times of the object segmentation and extraction inventive principle clusters and the corresponding no-worsening feature clusters by taking the moving object feature cluster as the considered improving factor

| No-worsening feature cluster | Display times |
| --- | --- |
| Physical property cluster | 30 |
| Energy consumption cluster | 26 |
| Operation and recovery cluster | 24 |
| Moving object cluster | 16 |
| Control cluster | 16 |
| System efficiency and quality cluster | 15 |
| Cluster of manufacturing and measurement accuracy | 13 |
| Object consumption cluster | 6 |
| Cluster of substance amount | 5 |
| Non-moving object cluster | 0 |

TABLE 3

Probability value of each corresponding inventive principle cluster of the improved feature cluster of moving object

| Inventive principle cluster | Moving object $P(C_1|I_j)$ |
| --- | --- |
| Object segmentation and extraction cluster | 24.85% |
| Mechanical system replacement cluster | 18.15% |
| Vibration and structural dynamicity cluster | 10.26% |
| Physical change cluster | 9.27% |
| Material cluster | 6.71% |
| Advanced processing cluster | 5.52% |
| Cluster of partial action or structural change | 5.13% |
| System combination cluster | 4.93% |
| Balance object cluster | 4.54% |
| Rejection and maintenance cluster | 3.94% |
| Counteraction cluster | 2.76% |
| Chemical cluster | 2.56% |
| Harmful factor cluster | 1.38% |

TABLE 4

Probability values of the corresponding object segmentation and extraction inventive principle clusters and the corresponding no-worsening feature clusters while taking the moving object feature cluster as the considered improving factor

| No-worsening feature cluster | Object segmentation and extraction $P'(C'_1|I'_j)$ |
| --- | --- |
| Physical property cluster | 19.9% |
| Energy consumption cluster | 17.2% |
| Operation and recovery cluster | 15.9% |
| Moving object cluster | 10.6% |
| Control cluster | 10.6% |
| Cluster of system efficiency and quality | 9.9% |
| Cluster of manufacturing and measurement accuracy | 8.6% |
| Object consumption cluster | 4.0% |
| Cluster of substance amount | 3.3% |
| Non-moving object cluster | 0.0% |

TABLE 5

Fuzzy relationship values of moving object feature cluster

| Major considered feature factor category | Fuzzy relationship value of feature factor | | | |
| --- | --- | --- | --- | --- |
| | $F\_value_1$ of WMO | $F\_value_2$ of LMO | $F\_value_3$ of AMO | $F\_value_1$ of VMO |
| WMO | 1 | 0.6 | 0.7 | 0.8 |
| LMO | 0.6 | 1 | 0.8 | 0.7 |
| AMO | 0.6 | 0.8 | 1 | 0.7 |
| VMO | 0.8 | 0.6 | 0.7 | 1 |

TABLE 6

Fuzzy relationship values of moving object feature cluster

| Major considered feature factor category | Fuzzy relationship value of feature factor | | | |
|---|---|---|---|---|
| | $F\_value_1$ of WMO | $F\_value_2$ of LMO | $F\_value_3$ of AMO | $F\_value_1$ of VMO |
| WMO | 1 | 0.6 | 0.7 | 0.8 |
| LMO | 0.6 | 1 | 0.8 | 0.7 |
| AMO | 0.6 | 0.8 | 1 | 0.7 |
| VMO | 0.8 | 0.6 | 0.7 | 1 |

TABLE 7

Display times of the corresponding object segmentation and extraction cluster of each feature factor in the moving object cluster

| | Feature Factor Category | | | |
|---|---|---|---|---|
| | WMO | LMO | AMO | VMO |
| Display Times ($N_i$) | 20 | 37 | 34 | 35 |

TABLE 8

Fuzzy relationship values that take WMO as the major element in the moving object cluster

| | Feature Factor Category | | | |
|---|---|---|---|---|
| | WMO | LMO | AMO | VMO |
| Fuzzy relationship value ($F\_value_i$) | 1 | 0.6 | 0.7 | 0.8 |

TABLE 9

Display times of the added fuzzy value of the corresponding object segmentation and extraction cluster of each feature factor and the total display times of the added fuzzy values of the WMO-based object segmentation and extraction cluster

| | Feature Factor Category | | | |
|---|---|---|---|---|
| | WMO | LMO | AMO | VMO |
| $I\_F\_value_i$ | 20 | 22.2 | 23.8 | 28 |
| $S\_F\_value_1$ | 94 | | | |

TABLE 10

Representative values of the $P(C_m)$ and $P(F\_I_n|C_m)$ of the moving object cluster

| | Improving feature cluster | |
|---|---|---|
| Inventive principle cluster | $P(C_m)$ | $P(F\_I_n|C_m)$, n = 1, 2, ... 13 |
| $F\_I_1$ | $\dfrac{396.1}{5317.1}$ | $\dfrac{94}{396.1}$ |

TABLE 11

Probability value of the added fuzzy value of the corresponding object segmentation and extraction cluster of the moving object cluster

| | Improving feature cluster |
|---|---|
| Inventive principle cluster | $P(C_m|F\_I_n)$, n = 1, 2, ... 13 |
| Object segmentation and extraction cluster | 23.73% |

TABLE 12

Fuzzied probability value of each corresponding inventive principle cluster of the moving object improved feature cluster which takes WMO as the consideration target.

| Inventive principle cluster | Moving object improved feature cluster $P(C_m|F\_I_n)$ |
|---|---|
| Object segmentation and extraction cluster | 23.73% |
| Mechanical system replacement cluster | 17.72% |
| Vibration and structural dynamicity cluster | 10.22% |
| Physical change cluster | 9.90% |
| Material cluster | 7.45% |
| Advanced processing cluster | 5.50% |
| Cluster of partial action or structural change | 5.05% |
| System combination cluster | 4.80% |
| Balance object cluster | 4.65% |
| Rejection and maintenance cluster | 4.12% |
| Chemical cluster | 2.75% |
| Counteraction cluster | 2.58% |
| Harmful factor cluster | 1.54% |

TABLE 13

Display times of the corresponding physical property cluster of the feature factor in the TRIZ matrix

| | Corresponding no-worsening feature cluster of physical segmentation and extraction cluster Feature Factor Category | | | |
|---|---|---|---|---|
| | WMO | LMO | AMO | VMO |
| Display Times ($N\_N_i$) | 6 | 8 | 8 | 8 |

TABLE 14

Fuzzy relationship values of the feature factor in the moving object cluster that takes WMO as the major consideration factor

| | Feature Factor Category | | | |
|---|---|---|---|---|
| | WMO | LMO | AMO | VMO |
| Fuzzy relationship value ($F\_value_i$) | 1 | 0.6 | 0.7 | 0.8 |

TABLE 15

Display times of the added fuzzy value of the physical property cluster in each feature factor and the total display times of the added fuzzy values of the entire cluster

| | Corresponding no-worsening feature cluster of physical segmentation and extraction cluster Feature Factor Category | | | |
|---|---|---|---|---|
| | WMO | LMO | AMO | VMO |
| $N'\_I\_F\_value_i$ | 6 | 4.8 | 5.6 | 6.4 |
| $N'\_S\_F\_value_j$ | | 22.8 | | |

TABLE 16

Representative values of $P'(C_m')$ and $P'(F'\_I_n|C_m')$ of the object segmentation and extraction inventive principle cluster

| | Inventive principle cluster | |
|---|---|---|
| Worsening feature cluster | $P'(C_l')$ | $P'(F'\_I_n|C_l')$ <br> n = 1, 2, ... 10 |
| $F'\_I_1$ | $\dfrac{112.4}{467.4}$ | $\dfrac{22.8}{112.4}$ |

TABLE 17

Probability value of the added fuzzy value required by the system of the corresponding physical property cluster of the moving object cluster

| Worsening feature cluster | Inventive principle cluster $P'(C'_1|F'\_I_n)$ |
|---|---|
| Physical property cluster ($F'\_I_1$) | 20.28% |

TABLE 18

Probability value of the added fuzzy value, which is matched with the Bayes probability equation of the system of each corresponding no-worsening feature cluster of the corresponding object segmentation and extraction inventive principle cluster of the moving object cluster

| No-worsening feature cluster | Inventive principle cluster Object Segmentation and Extraction Cluster |
|---|---|
| Physical property cluster | 20.28% |
| Energy consumption cluster | 17.70% |
| Operation and recovery cluster | 15.93% |
| Moving object cluster | 10.59% |
| Control cluster | 10.23% |
| Cluster of system efficiency and quality | 10.14% |
| Cluster of manufacturing and measurement accuracy | 8.36% |
| Object consumption cluster | 3.74% |
| Cluster of substance amount | 3.02% |
| Non-moving object cluster | 0.00% |

TABLE 19

TRIZ matrix

| | Improved feature cluster |
|---|---|
| No worsening feature cluster | Inventive principle cluster |

TABLE 20

Simplified TRIZ matrix

| | | No-worsening feature cluster | |
|---|---|---|---|
| | Improved feature cluster | Cluster of manufacturing and measurement accuracy of no-worsening feature cluster | 28 Accuracy of measurement <br> 29 Accuracy of manufacturing <br> 32 Manufacturability <br> 39 Productivity |
| Control cluster of improved feature cluster | 35 Conformity <br> 36 Complexity of device <br> 37 Complexity of control <br> 38 Level of automation <br> 39 Productivity | Mechanical system replacement cluster of inventive principle cluster | 17. Moving to a new dimension <br> 26. Copying <br> 28. Replacement of a mechanical system <br> 29. Use of a pneumatic or hydraulic construction <br> 32. Color change |

What is claimed is:

1. A clustering TRIZ analysis method, comprising:
   (1) constructing cluster elements according to features and inventive principles of a TRIZ matrix by associating items with similar physical meanings as one cluster;
   (2) calculating display times of each cluster according to improved feature cluster and inventive principle cluster, calculating the display times of a corresponding inventive principle cluster and a no-worsening feature cluster according to a TRIZ contradiction matrix, and storing results of the calculation in a database;
   (3) determining discrimination values of a model according to the display time results in step (2), and using the discrimination values to determine a priority order of the clusters.

2. The clustering TRIZ analysis method of claim 1, wherein the model comprises a display time model, Bayes probability model, fuzzy value model, and a combined fuzzy value and Bayes probability model, and the method determine discrimination values according to a fuzzy relation value defined by the models.

3. The clustering TRIZ analysis method of claim 1, further comprising:
   providing a design direction;
   selecting one of the improved feature clusters according to the design direction;
   determining the priority of inventive principle cluster according to the selected improved feature cluster, and generating referential numerical values and discrimination values corresponding thereto;
   determining the priority order of the no-worsening feature cluster according to the selected inventive principle clusters, and generating referential numerical values corresponding thereto;

determining a general table of discrimination values of the entire inventive principle cluster and the no-worsening feature cluster, and probability values corresponding to the display times, wherein determination is made as to whether the selected no-worsening feature clusters corresponding to the highest priority order is in the general table of discrimination values of the inventive principle cluster and the no-worsening feature cluster, whether the roll is the highest priority order through the vertical examination of the selected inventive principle clusters or whether the column is the best priority order when looking at the horizontal examination of the selected no-worsening feature clusters, and whether the result conforms with the design direction, limitation conditions and the technological requirements, and if so, deciding on a desired no-worsening feature cluster, otherwise, adopting the inventive principle cluster again;

selecting, from the selected improved feature clusters and the determined no-worsening feature clusters, a single improved feature and a single worsened feature conforming to the design direction and limitation conditions, and searching the original TRIZ matrix to identify a corresponding inventive principle.

4. The clustering TRIZ analysis method of claim 1, further constructing cluster elements associating similar items as one cluster.

5. The clustering TRIZ analysis method of claim 4, further associating 39 features of the TRIZ matrix into the following clusters—moving object cluster, non-moving object cluster, object service life cluster, energy consumption cluster, substance amount cluster, manufacturing and measurement accuracy cluster, control cluster, operation and recovery, system efficiency and quality cluster, physical property cluster, wherein:

the moving object cluster comprises features of weight of the moving object, length of the moving object, area of the moving object, and volume of the moving object;

the non-moving object cluster comprises features of weight of the non-moving object, length of the non-moving object, area of the non-moving object, and volume of the non-moving object;

the object service life cluster comprises features of durability of the moving object, durability of the non-moving object, and waste of the substance;

the system efficiency and quality cluster comprises features of loss of the information, reliability, harmful factors acting on the object, and harmful side effects; and the physical property cluster comprises features of speed, force, tension/pressure, shape, stability of the object, and hardness.

6. The clustering TRIZ analysis method of claim 4, further associating 40 inventive principles of the TRIZ matrix into the following clusters—object segmentation and extraction cluster, prior handling cluster, counteraction cluster, cluster of partial action or structural change, balance object cluster, vibration and structural dynamicity cluster, harmful factor cluster, mechanical system replacement cluster, material cluster, physical change cluster, chemical action cluster, rejection and maintenance cluster, and system combination cluster, wherein:

object segmentation and extraction cluster comprises inventive principles of segmentation, extraction, asymmetry, prior action, cushion in advance, and dynamicity;

the cluster of partial action or structural change comprises inventive principles of local quality, spheroidality, partial, overdone or excessive action;

the mechanical system replacement cluster comprises inventive principles of moving to a new dimension, copying, replacement of a mechanical system, use of a pneumatic or hydraulic construction, and color change;

the material cluster comprises inventive principles of substituting an expensive, durable object by an inexpensive, non-durable one, flexible film or thin membrane, and use of porous material, homogeneity, and composite material.

7. The clustering TRIZ analysis method of claim 2, wherein the display time model comprises:

selecting the improved feature clusters and the inventive principle clusters having similar physical meanings;

calculating display times of each inventive principle cluster corresponding to each improved feature cluster according to the TRIZ matrix;

determining the priority order of the inventive principle clusters according to the calculated display times;

calculating display times of each of the no-worsening feature clusters according to the TRIZ matrix and the inventive principle cluster corresponding to the improved feature cluster; and determining priority order of the no-worsening feature clusters according to the calculated display times.

8. The clustering TRIZ analysis method of claim 2, wherein the Bayes probability model comprises:

selecting the improved feature clusters and the inventive principle clusters having similar physical meanings;

determining display probability according to the contents of the TRIZ matrix, and the display times of each corresponding inventive principle cluster ($I_j$) made by each improved feature cluster, and the Bayes probability ($P(C_i|I_j)$) of each inventive principle cluster is determined according to the Bayes theorem equation as follows:

$$P(C_i \mid I_j) = \frac{P(C_i) \times P(I_j \mid C_i)}{P(I_j)} = \frac{P(C_i) \times P(I_j \mid C_i)}{\sum_{j=1}^{a} [P(C_i) \times P(I_j \mid C_i)]}, \text{ wherein,}$$

denotes the total number of inventive principle clusters, i denotes the number of improved feature clusters, and i=1, 2, ..., 10, j denotes number of inventive principle clusters, and j=1, 2, ..., 13, $P(C_i)$ denotes the display probability of improved feature cluster ($C_i$) in the entire TRIZ table, and $P(I_j|C_i)$ denotes the display probability of inventive principle cluster ($I_j$) in the improved feature cluster;

determining the priority order according to the calculated Bayes probability value, which is used as a reference in determining priority order in the no-worsening feature clusters;

determining display probability according to the TRIZ matrix and the display times of each corresponding no-worsening feature cluster ($I'_j$) made by each corresponding inventive principle cluster ($C'_i$) of each improved feature cluster, the Bayes probability value $P'(C'_i|I'_j)$ of each no-worsening feature cluster is determined according to the Bayes theorem equation as follows:

$$P'(C'_i | I'_j) = \frac{P'(C'_i) \times P'(I'_j | C'_i)}{P'(I'_j)} = \frac{P'(C'_i) \times P'(I'_j | C'_i)}{\sum_{j=1}^{b} [P'(C'_i) \times P'(I'_j | C'_i)]}, \quad (3\text{-}2)$$

wherein, b denotes the total number of no-worsening feature clusters,
i denotes the number of inventive principle clusters, and i=1, 2, . . . , 13,
j denotes number of no-worsening feature clusters, and j=1, 2, . . . , 10,
$P'(C'_i)$ denotes the display probability of improved feature cluster ($C'_i$) in the inventive feature cluster, and
$P'(I'_j|C'_i)$ denotes the display probability of no-worsening feature cluster ($I'_j$) in the inventive principle cluster; and
determining priority order of the no-worsening feature cluster according to the calculated Bayes probability value, and using it as a reference for determining priority order in the no-worsening feature cluster.

9. The clustering TRIZ analysis method of claim 2, wherein the fuzzy value model comprises:
selecting the improved feature clusters and the inventive principle clusters having similar physical meanings;
defining the fuzzy relationship value of each element in each feature cluster by 10 feature clusters having similar physical meanings and using a feature in the cluster as a major consideration factor for defining the fuzzy relationship value (F_value) between the major considered feature factor and other related features in accordance with the concept of the fuzzy object oriented model;
determining the display times ($I\_F\_value_i$) of the added fuzzy value of each cluster and the total display times ($S\_F\_value_j$) of the added fuzzy values of the entire cluster required by the system in accordance with the TRIZ matrix and the display times ($N_i$) of each corresponding inventive principle cluster made by the improved feature cluster, and from the fuzzy relationship value ($F\_value_i$) between the display times ($N_i$) and the elements in the improved feature cluster acquired through the fuzzy object oriented model, as follows:

$$I\_F\_value_i = N_i \times F\_value_i, \quad i = 1, \ldots, a$$

$$S\_F\_value_j = \sum_{i=1}^{a} (I\_F\_value_i), \quad j = 1, 2, \ldots, 13$$

wherein 'a' is the total number of feature factors contained in the cluster;
designating total display times of the added fuzzy values of the entire cluster as the priority order;
determining the display times ($N\_I\_F\_value_i$) of the added fuzzy value of each cluster and the total display times ($N\_S\_F\_value_j$) of the added fuzzy values of the entire cluster in accordance with the TRIZ matrix and the display times ($N\_N_i$) of each corresponding no-worsening feature cluster made by each corresponding inventive principle cluster of the elements in each improved feature cluster, and from the fuzzy relationship value ($F\_value_i$) between the display times ($N\_N_i$) and the elements in the improved feature clusters acquired through the fuzzy object oriented model, as follows:

$$N\_I\_F\_value_i = N\_N_i \times F\_value_i, \quad i = 1, \ldots, a$$

$$N\_S\_F\_value_j = \sum_{i=1}^{a} N\_I\_F\_value_i, \quad j = 1, 2, \ldots, 10$$

wherein 'a' is the total number of feature factors contained in the cluster; and
designating the total display times of the added fuzzy values of the entire cluster as the priority order in the no-worsening feature cluster.

10. The clustering TRIZ analysis method of claim 1, wherein the combined fuzzy value and Bayes probability model comprises:
selecting the improved feature clusters and the inventive principle clusters having similar physical meanings;
defining the fuzzy relationship value of each element in each cluster by 10 feature clusters having similar physical meanings and designating a feature in the cluster as a major consideration factor for defining the fuzzy relationship value (F_value) between the major considered feature factor and other related features in accordance with the fuzzy object oriented model;
determining the display times ($I\_F\_value_i$) of the added fuzzy value of each feature factor and the total display times ($S\_F\_value_i$) of the added fuzzy values of the entire cluster in accordance with the TRIZ matrix and the display times ($N_i$) of each corresponding inventive principle cluster made by the improved feature cluster ($C_m$), and from the fuzzy relationship value ($F\_value_i$) between the display times and the elements in the improved feature cluster acquired through the fuzzy object oriented model, as follows:

$$I\_F\_value_i = N_i \times F\_value_i, \quad i = 1, \ldots, a$$

$$S\_F\_value_j = \sum_{i=1}^{a} (I\_F\_value_i), \quad j = 1, 2, \ldots, 13,$$

wherein 'a' is the total number of feature factors contained in the cluster; and
determining the display probability ($P(F\_I_n|C_m)$) of the added fuzzy value according to the total display times ($S\_F\_value_i$) of the added fuzzy values of the entire cluster, as follows:

$$P(F\_I_n | C_m) = \frac{S\_F\_value_i}{\sum_{i=1}^{13} S\_F\_value_j}$$

$$P(C_m | F\_I_n) = \frac{P(C_m) \times P(F\_I_n | C_m)}{\sum_{n=1}^{13} [P(C_m) \times P(F\_I_n | C_m)]}, \text{ wherein,}$$

m is the number of improved feature clusters, and m=1, 2, . . . , 10,
n is the number of inventive principle clusters, and n=1, 2, . . . , 13,
$P(C_m)$ is the display probability of the added fuzzy value of the improved feature cluster ($C_m$) in the entire TRIZ matrix, and $P(F\_I_n|C_m)$ is the display probability of the added fuzzy value of the inventive principle cluster ($F\_I_n$) in the improved feature cluster;

designating the probability value of the added fuzzy value as the priority order in the inventive principle cluster;

determining the display times ($N'\_I\_F\_value_i$) of the added fuzzy value of each cluster and the total display times ($N'\_S\_F\_value_j$) of the added fuzzy values of the entire cluster in accordance with the TRIZ matrix, the display times ($N'\_N_i$) of each corresponding no-worsening feature cluster ($C'_m$) made by each corresponding inventive principle cluster of the element in each improved feature cluster, and the fuzzy relationship value ($F\_value_i$) between the display times ($N'\_N_i$) and the elements in the improved feature cluster determined by the fuzzy object oriented model, as follows:

$$N'\_I\_F\_value_i = N'\_N_i \times F\_value_i, \quad i = 1, \ldots, a$$

$$N'\_S\_F\_value_j = \sum_{i=1}^{a} N'\_I\_F\_value_i, \quad j = 1, 2, \ldots, 10,$$

wherein 'a' is the total number of feature factors contained in the cluster;

determining the display probability ($P'(F'\_I_n|C'_m)$) of the added fuzzy value according to the total display times ($N'\_S\_F\_value_j$) of the added fuzzy values of the entire cluster, as follows:

$$P'(F'\_I_n | C'_m) = \frac{N'\_S\_F\_value_j}{\sum_{j=1}^{10} N'\_S\_F\_value_j} \quad (3\text{-}13)$$

$$P'(C'_m | F'\_I_n) = \frac{P'(C'_m) \times P'(F'\_I_n | C'_m)}{\sum_{n=1}^{10} [P'(C'_m) \times P'(F'\_I_n | C'_m)]}, \text{ wherein,} \quad (3\text{-}14)$$

m is the number of inventive principle clusters, and m=1, 2, ..., 13, n is number of worsening feature clusters, and n=1, 2, ..., 10, $P'(C'_m)$ is the display probability of the added fuzzy value of the improved feature cluster ($C'_m$) in the improved feature cluster, $P'(F'I_n|C'_m)$ is the display probability of the added fuzzy value of the no-worsening feature cluster ($F'\_I_n$) in the inventive principle cluster; and designating the probability value of the added fuzzy value as the priority order in the no-worsening feature cluster.

* * * * *